Dec. 22, 1959     E. A. NEUGASS     2,917,838
ILLUMINATED WRITING PANEL
Filed March 10, 1955     2 Sheets-Sheet 1

INVENTOR.
EDWIN A. NEUGASS.
BY
ATTORNEY.

Dec. 22, 1959  E. A. NEUGASS  2,917,838
ILLUMINATED WRITING PANEL
Filed March 10, 1955  2 Sheets-Sheet 2

INVENTOR.
EDWIN A. NEUGASS.
BY
ATTORNEY.

United States Patent Office 2,917,838
Patented Dec. 22, 1959

2,917,838

ILLUMINATED WRITING PANEL

Edwin A. Neugass, Poteau, Okla.

Application March 10, 1955, Serial No. 493,460

5 Claims. (Cl. 35—66)

This invention relates generally to illuminated panels, and more particularly is directed to a panel to which erasable illuminated writing may be applied.

An object of the invention is to provide a panel on which suitable lines may be traced with a stylus or the like, and as such writing progresses, the lines thereof are brightly illuminated in contrast to the dark, or only dimly lit, remainder of the panel.

Another object is to provide a panel of the described character wherein the illumination of the lines previously traced on the panel may be conveniently erased to condition the panel for the application of other illuminated characters, indicia or lines thereon.

A further object is to provide a panel of the described character which, in addition to being adapted to be written upon with a stylus to provide erasable illuminated lines, is also provided with permanent illuminated lines.

A still further object is to provide a panel adapted to be written upon with a stylus to provide lines which are clearly visible under ambient illumination, and which, when the panel is internally illuminated, appear as brightly illuminated lines against a dark background.

In accordance with this invention, the above, and other objects, advantages and features of the invention appearing in the following detailed description are achieved by providing a panel which includes a plate of transparent, light transmitting material having highly polished surfaces and means for admitting light to the interior of the plate. By reason of the highly polished surfaces of the transparent plate, the light admitted thereto is totally reflected from the polished surfaces and normally retained within the transparent plate. Positioned against the front or upper surface of the transparent plate, but free of the latter except along one or more edges thereof, is a flexible sheet of translucent material having a highly polished surface at the side thereof confronting the transparent plate. Thus, when the translucent sheet is locally pressed against the adjacent surface of the illuminated transparent plate, the confronting highly polished surfaces adhere to each other at the point, or along the line, of the application of pressure, and the light escapes from the transparent plate at the point, or along the line, where the translucent sheet adheres to the transparent plate, thereby to transilluminate the translucent sheet at such point or line. When the translucent sheet is pulled free of the transparent plate to break the adhesion between the confronting surfaces thereof, the illuminated points or lines at the previous locations of adhesion are erased.

In accordance with one aspect of the invention, permanent or non-erasable illuminated lines may be provided by cutting or engraving suitable grooves in the rear or undersurface of the transparent plate, or by applying white paint to such rear or under surface of the transparent plate in the desired pattern, so that, in either case, the light rays within the transparent plate which strike against the grooves or the painted pattern thereafter impinge against the front or upper surface of the transparent plate at angles exceeding the reflection angle, thereby to destroy the total reflection and to permit light to escape forwardly from the transparent plate in a pattern corresponding to that of the grooves or white paint for permanently transilluminating the translucent sheet in the form of such pattern.

In accordance with another aspect of the invention, an opaque, preferably dark coating, for example, of paint having little adhesion for the front or upper surface of the translucent sheet, is applied to the surface of the latter facing away from the transparent plate, and the writing on the panel is effected with a stylus having an abrasive tip so that the stylus scrapes away the opaque, dark colored coating to expose the underlying translucent layer at the same time as it effects the adhesion of the latter to the transparent plate. Accordingly, under ambient illumination, the writing is defined by the contrast between the exposed portions of the translucent sheet, which is preferably white in color, and the adjacent dark, preferably black, opaque layer or coating which provides a background. When the transparent plate is internally illuminated, the exposed portions of the translucent sheet, along which the latter is adhered to the transparent plate, are transilluminated thereby to provide brightly illuminated writing against a dark background.

In order that the invention may be fully understood, illustrative embodiments thereof are hereinafter described in detail with reference to the accompanying drawings forming a part hereof, and wherein.

Figure 1:
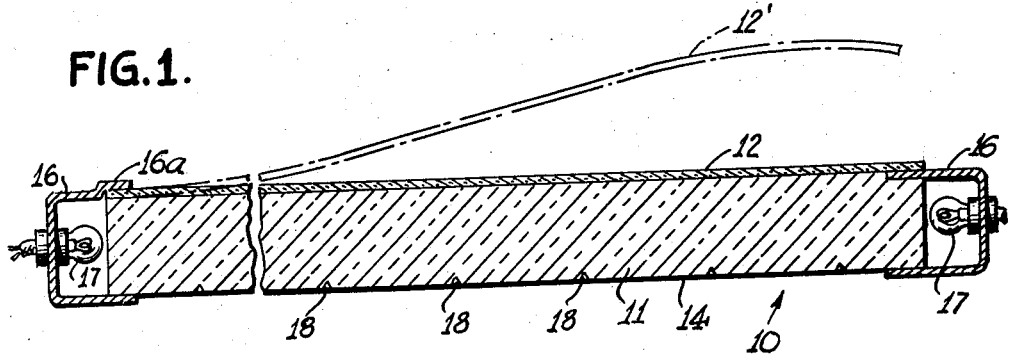
Fig. 1 is a fragmentary, sectional view through a panel constructed in accordance with one embodiment of the invention.
Figure 2:
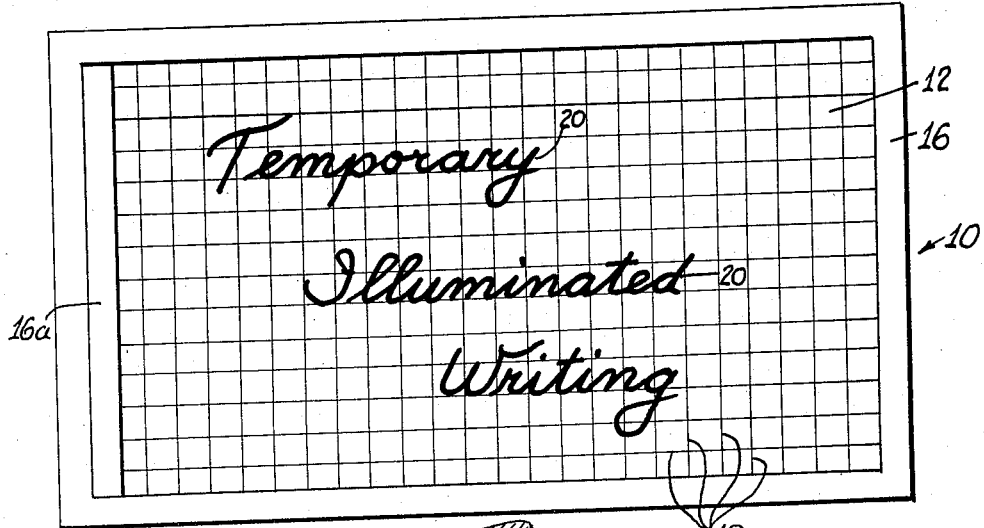
Fig. 2 is a plan view of the panel illustrated in Fig. 1.

Referring to the drawings in detail, and initially to Figs. 1 and 2 thereof, a panel embodying the present invention is there illustrated and generally identified by the reference numeral 10. The panel 10 includes a transparent, light transmitting plate 11 which may be formed of glass or of a plastic material of the class of acrylic resins and their polymers and co-polymers, methyl methacrylate being preferred, and a flexible, translucent sheet 12, which is preferably formed of a plastic material, such as, for example, cellulose acetate, polyvinyl or vinyl resins, their polymers or co-polymers. The translucent sheet 12 is coextensive with the transparent plate 11 and normally lies against the front or upper surface 13 of the latter, but it is to be understood that the sheet 12 is physically free of the plate 11 except along one or more edges of the latter.

The opposite surfaces 13 and 14 of the transparent plate are highly polished so that, when artificial illumination is admitted to the interior of the plate 11, the light rays are normally totally reflected at the surfaces 13 and 14 thereby to prevent the escape of light from the plate 11, and particularly from the front or upper surface 13 thereof.

In accordance with the present invention, the rear or undersurface of the translucent sheet 12, that is, the surface of the sheet 12 confronting the surface 13 of the transparent plate, is also highly polished, whereby, when pressure is applied to the sheet 12 to urge it against the surface 13 of the transparent plate, the confronting surfaces of the sheet 12 and plate 11 are brought into intimate contact at the point, or along the line, of the application of such pressure and molecular adhesion between the surfaces is produced by such intimate contact. Thus, the total reflection of the light travelling through the transparent plate 11 is destroyed at those portions of the surface 13 where the sheet 12 adheres thereto, and light escapes from the plate 11 at the points, or along the lines of adhesion to there transilluminate the translucent sheet 12 and define brightly illuminated points or lines against a dimly illuminated background.

Figure 3:
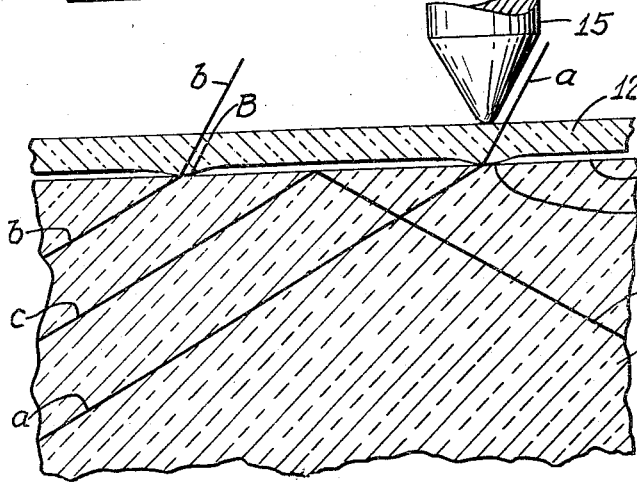
Fig. 3 is a fragmentary sectional view, on a greatly enlarged scale, and illustrating the operation of the panel shown in Figs. 1 and 2.

Referring to Fig. 3, wherein the above phenomenon is illustrated, it is apparent that the translucent sheet 12 is normally not in intimate contact with the surface 13 of the transparent, light transmitting plate 11, and that a layer of air is disposed between the confronting surfaces. However, when a stylus 15, the point thereof being shown in the drawing, is pressed against the sheet 12, the latter is caused to adhere locally to the surface 13, as at the points A and B. Normally, the light rays travelling through the transparent plate 11 and striking against the surface 13 thereof, for example, the light ray indicated by the heavy line *c*, are reflected back into the body of the plate 11. However, when light rays strike against the surface 13 at the locations where the sheet 12 is adhered thereto, for example, the light rays *a* and *b* striking against the surface 13 at the locations A and B, respectively, such light rays escape from the panel plate 11 and there transilluminate the translucent sheet 12.

When it is desired to erase or eradicate the writing or other markings defined by the transillumination of sheet 12, the translucent sheet is separated from the surface 13 of the transparent plate thereby breaking the adhesion between the translucent sheet and the transparent plate, for example, at the locations A and B of Fig. 3, so that the total reflection of the light within the transparent plate is restored.

In order to permit the separation of the sheet 12 from the transparent plate 11, the sheet and plate are secured together only at one or more of the edges thereof. For example, in the embodiment illustrated in Figs. 1 and 2, the transparent plate 11 is of rectangular plan form and is surrounded by a frame 16 which is of U-shaped cross-sectional configuration, as seen in Fig. 1, and opens inwardly to embrace the edge portions of the transparent plate. Suitable electrical bulbs 17 are provided within the frame 16 to edge-light the transparent plate 11, and a portion 16a of the frame 16 overlies one edge of the translucent sheet 12 and clamps the latter to the plate 11 along that one edge so that the sheet 12 can lie against the surface 13 of the plate 11 to permit the definition of writing thereon by transillumination, and can be pulled away from the plate 11, as indicated at 12' on Fig. 1, to erase the transilluminated writing in the manner described above.

Although the embodiment of the invention illustrated in Figs. 1 and 2 provides for edge-lighting of the transparent plate 11, it is to be understood that any other conventional arrangement for admitting light to the interior of the transparent plate may be employed. For example, suitable lighting receptacles may be embodied within the transparent plate at locations spaced from the edges thereof for admitting light directly into the interior of the transparent plate, or the transparent plate may be illuminated from the rear by light admitted to the interior of the transparent plate at grooves or the like cut in the rear surface thereof.

Where it is desired to provide the panel with permanently illuminated lines, such as, for example, a grid of intersecting parallel lines representing latitude and longitude on a navigational plotting board, grooves 18 may be engraved or otherwise formed in the under or rear surface 14 of the transparent plate 11 in the pattern of the desired permanently illuminated lines. The grooves 18 serve to alter the angles of reflection of the light rays impinging against the surface 14 at the locations of the grooves, and such light rays then escape through the surface 13 and transilluminate the sheet 12 in a pattern corresponding to that of the grooves 18. Thus, as seen in Fig. 2, the panel 10, when the plate 11 thereof has light admitted thereto, will present a series of permanently illuminated lines 19, and temporary or erasable illuminated lines 20 which are produced by writing on the sheet 12 with a stylus or other hard instrument capable of pressing the translucent sheet against the transparent plate to cause the adhesion therebetween in the manner described above.

Figure 7:
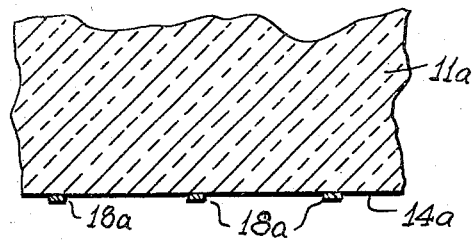
Fig. 7 is a fragmentary sectional view having still another embodiment of the invention.

In place of the grooves 18 defining the permanently illuminated writing, lines and the like, as in Fig. 1, such permanently illuminated portions of the panel may be defined by a suitable pattern of white paint, indicated at 18a on Fig. 7, which is applied to the under or rear surface 14a of the transparent plate 11a. The pattern of white paint 18a acts substantially in the same manner as the grooves 18 of Fig. 1 and causes the escape of light through the front or upper surface of the plate 11a to transilluminate the adjacent translucent sheet (not shown in Fig. 7).

Figure 5:
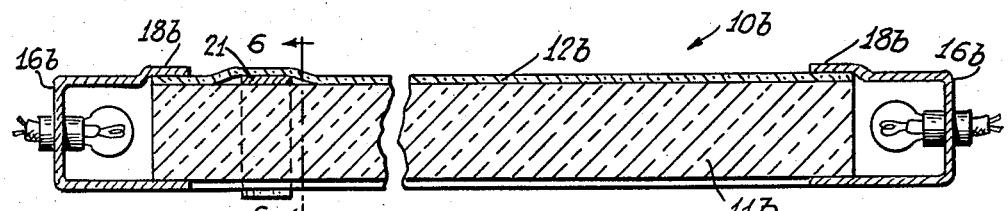
Fig. 5 is a sectional view similar to Fig. 1, but illustrating a panel constructed in accordance with still another embodiment of the invention.
Figure 6:
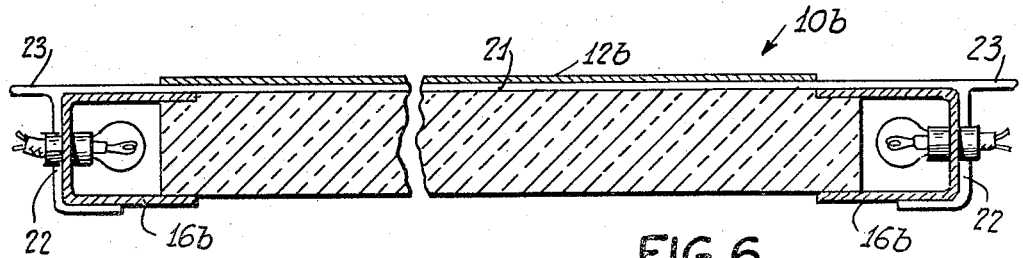
Fig. 6 is a sectional view taken along the lines 6—6 of Fig. 5.

Although in the embodiment illustrated in Figs. 1 and 2, the translucent sheet 12 is completely free of the transparent plate 11, except along a single edge thereof, in order to permit erasing of the temporary illuminated writing, reference to Figs. 5 and 6 will show that, in the rectangular panel 10b there illustrated, the translucent sheet 12b is clamped to the transparent plate 11b by portions 18b of the frame 16b disposed at two opposite edges of the panel. Thus, the sheet 12b and plate 11b are clamped together along opposite parallel edges, while the remaining edges of the sheet and plate, extending at right angles to the clamped edges, are free of each other, as seen in Fig. 6.

In order to separate the translucent sheet 12b from the transparent plate 11b for erasing the temporary illuminated writing, the panel 10b includes a bar 21 slidably disposed between the plate 11b and sheet 12b and extending parallel to the clamped together edges of the sheet and plate. The bar 21 is slidable toward and away from the clamped together edge portions, and may be guided in such movement by guide portions 22 which extend from the bar 21 and slidably embrace the adjacent portions of the frame 16b. In order to facilitate the manipulation of the bar 21, the opposite ends of the latter may be provided with finger engageable portions 23 extending laterally beyond the guide portions 22.

During writing on the panel 10b, the erasing bar 21 is disposed adjacent one or the other of the clamped together edge portions of the sheet and plate so that the translucent sheet may be pressed against the transparent plate to cause adhesion therebetween for defining the transilluminated temporary writing. When it is desired to erase such temporary illuminated writing, the bar 21 is displaced between the sheet and transparent plate from its original position to a position adjacent the opposite clamped together edges, and during such displacement of the bar 21, the latter separates the translucent sheet from the transparent plate and thereby breaks the adhesion therebetween and erases the transilluminated temporary writing.

Figure 4:
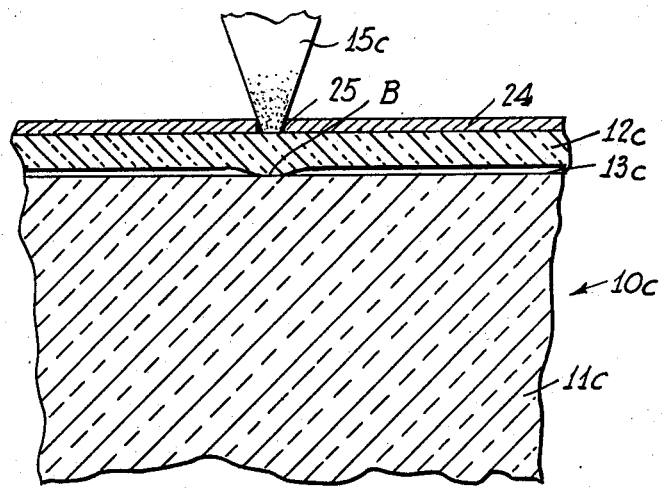
Fig. 4 is a view similar to Fig. 3, but showing a panel constructed in accordance with another embodiment of this invention.

Although the temporary writing provided on the panels described above and particularly in connection with the illustration of Fig. 3 is visible only when the transparent plate has artificial illumination admitted thereto, and no writing is visible on the translucent sheet under ambient illumination or in the absence of internal illumination of the transparent plate, a panel embodying the present invention may be arranged so that the temporary writing will be visible either under ambient illumination or when the panel is internally illuminated. Referring specifically to Fig. 4, it will be seen that the panel 10c, therein illustrated, as before, includes a transparent plate 11c and a translucent sheet 12c extending over the surface 13c of the transparent plate and separable from the latter. In addition to the above elements, the panel 10c has a dark, preferably black, coating 24 which is applied, for example, by spraying, to the upper or front surface of the translucent sheet 12c, that is, to the surface of the translucent sheet facing away from the plate 11c. The coating 24 is formed of an easily abraded paint or the like, for example, a water base paint, having little adhesion for the surface of the translucent sheet. Accordingly, when a stylus 15c having a tip with abrasive thereon is employed for writing on the coated surface of the translucent sheet, the pressure of the stylus not only causes the translucent sheet to adhere to the surface 13c of the transparent panel, as at B, but also scrapes away the coating 24, as at 25, to expose the underlying surface of the translucent sheet 12c. In the panel 10c, the translucent sheet 12c is white, or at least light in color, so that a sharp contrast will be provided between the exposed portions of the translucent sheet, as defined by the scraped away parts of the coating 24, and the dark or black color of the opaque coating. Thus, following writing on the panel with the abrasive tipped stylus 15c, such writing will be visible under ambient illumination, by reason of the contrast between the exposed portions of the translucent sheet and the remaining portions of the coating 24, and when the transparent plate 11c has light admitted thereto, the exposed portions of the translucent sheet 12c will be transilluminated in the manner described in connection with Fig. 3.

When it is desired to erase the temporary writing formed on the panel 10c by the abrading stylus 15c, the translucent sheet is separated from the surface 13c of the transparent plate, thereby to interrupt the transillumination of the translucent sheet, and the coating 24 is renewed by again spraying thereon a suitable paint or the like.

Although several embodiments of this invention have been described in detail herein and shown in the drawings for illustrative purposes, it is to be understood that the invention is not limited to these precise embodiments, and that various changes and modifications may be effected in the latter without departing from the scope or spirit of the invention as defined in the appended claims.

What I claim is:

1. A device of the described character comprising a plate of transparent material, illuminating means for admitting light to the interior of said transparent plate, a flexible sheet of translucent material extending over a surface of said plate and substantially free of the latter, the surfaces of said plate being parallel and highly polished to normally effect the total reflection of light admitted to the interior of said plate, and the surface of said sheet confronting said plate being also highly polished so that said sheet, when pressed against said plate, adheres molecularly to the plate at the locations where the pressure is applied and light escapes from said plate through said locations to transilluminate the sheet at said locations, and so that separation of the sheet from the plate eradicates the transillumination at said locations, said plate having a light reflecting pattern at the surface thereof remote from said sheet operative to reflect light from the interior of said plate through the surface of the latter adjacent said sheet thereby to permanently transilluminate said sheet with a pattern corresponding to said light reflecting pattern.

2. A device according to claim 1; wherein said light reflecting pattern is defined by white paint applied to said surface of the plate remote from said sheet.

3. A device according to claim 1; wherein said light reflecting pattern is defined by engraving in said surface of the plate remote from said sheet.

4. A device according to claim 1; wherein said plate and sheet are polygonal in plan form and said sheet is secured to said plate along only one edge thereof.

5. A device according to claim 1; wherein said plate and sheet are rectangular in plan form and said sheet is secured to said plate only along two opposite edges thereof, and further comprising a bar disposed between said sheet and plate and slidable toward and away from said two opposite edges of the plate and sheet so that, when it is desired to eradicate the transillumination of the translucent sheet at the locations where it adheres to the transparent plate, said bar can be displaced from a position adjacent one of said opposite edges to a position adjacent the other of said opposite edges and, during the course of such displacement, the bar separates said sheet from the transparent plate.

References Cited in the file of this patent

UNITED STATES PATENTS

| | | |
|---|---|---|
| 1,543,430 | Fischer | June 23, 1925 |
| 1,816,220 | Hotchner | July 28, 1931 |
| 1,839,287 | Wolfson | Jan. 5, 1932 |
| 1,843,980 | Hotchner | Feb. 9, 1932 |
| 1,931,742 | Scharringhausen | Oct. 24, 1933 |
| 2,027,034 | Fuller | Jan. 7, 1936 |
| 2,202,682 | Arberry | May 28, 1940 |
| 2,223,409 | Dixon | Dec. 3, 1940 |
| 2,451,979 | Rosenblum | Oct. 19, 1948 |
| 2,697,884 | Dechert | Dec. 28, 1954 |

FOREIGN PATENTS

| | | |
|---|---|---|
| 343,742 | Great Britain | Feb. 26, 1931 |